United States Patent [19]

Yoshida

[11] Patent Number: 4,941,009

[45] Date of Patent: Jul. 10, 1990

[54] METHOD FOR SLOW SYNCHRO-FLASH PHOTOGRAPHY

[75] Inventor: Makoto Yoshida, Hachioji, Japan

[73] Assignee: Konica Corporation, Tokyo, Japan

[21] Appl. No.: 371,093

[22] Filed: Jun. 26, 1989

[30] Foreign Application Priority Data

Jul. 7, 1988 [JP] Japan .................................. 63-167742
Sep. 9, 1988 [JP] Japan .................................. 63-224455

[51] Int. Cl.⁵ ...................... G03B 13/36; G03B 15/02
[52] U.S. Cl. .................................. 354/402; 354/403;
354/414; 354/421
[58] Field of Search ............... 354/400, 402, 403, 408,
354/407, 414, 421

[56] References Cited

U.S. PATENT DOCUMENTS 4,188,104  2/1980  Uchiyama et al. .................. 354/414
4,690,536  9/1987  Nakai et al. .......................... 354/414
4,772,910  9/1988  Fields ................................... 354/414
4,801,964  1/1989  Desormeaux ....................... 354/414

Primary Examiner—Russell E. Adams
Attorney, Agent, or Firm—Finnegan, Henderson, Farabow, Garrett, and Dunner

[57] ABSTRACT

A method for taking a photograph with a camera having a flash light exposure, a natural light exposure, and an automatic selection where the camera can automatically select the flash or natural light exposure, depending upon photographic conditions. This method comprises the steps of determining distances from the camera to objects in a photographic view, detecting luminances of those objects, and activating the camera for taking a photograph of some of the objects with a flash light exposure and of others of the objects with a natural light exposure when the distances and the luminances of the objects are in a certain condition.

8 Claims, 8 Drawing Sheets

FIG. 3
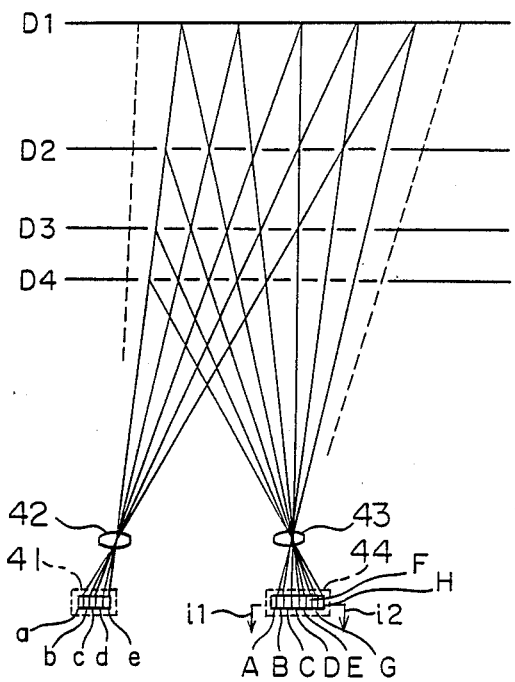
FIG. 4
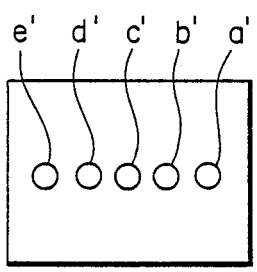
FIG. 5
| LIGHT EMITTING ELEMENT DISTANCE | a | b | c | d | e |
|---|---|---|---|---|---|
| D1 | A | B | C | D | E |
| D2 | B | C | D | E | F |
| D3 | C | D | E | F | G |
| D4 | D | E | F | G | H |
FIG. 6
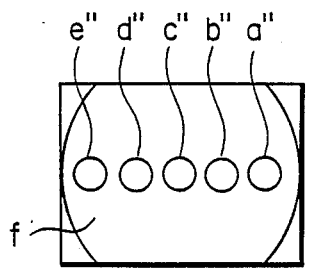

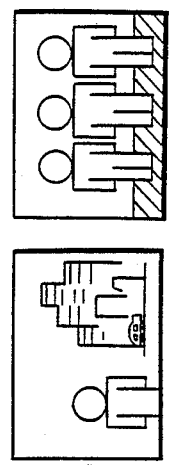
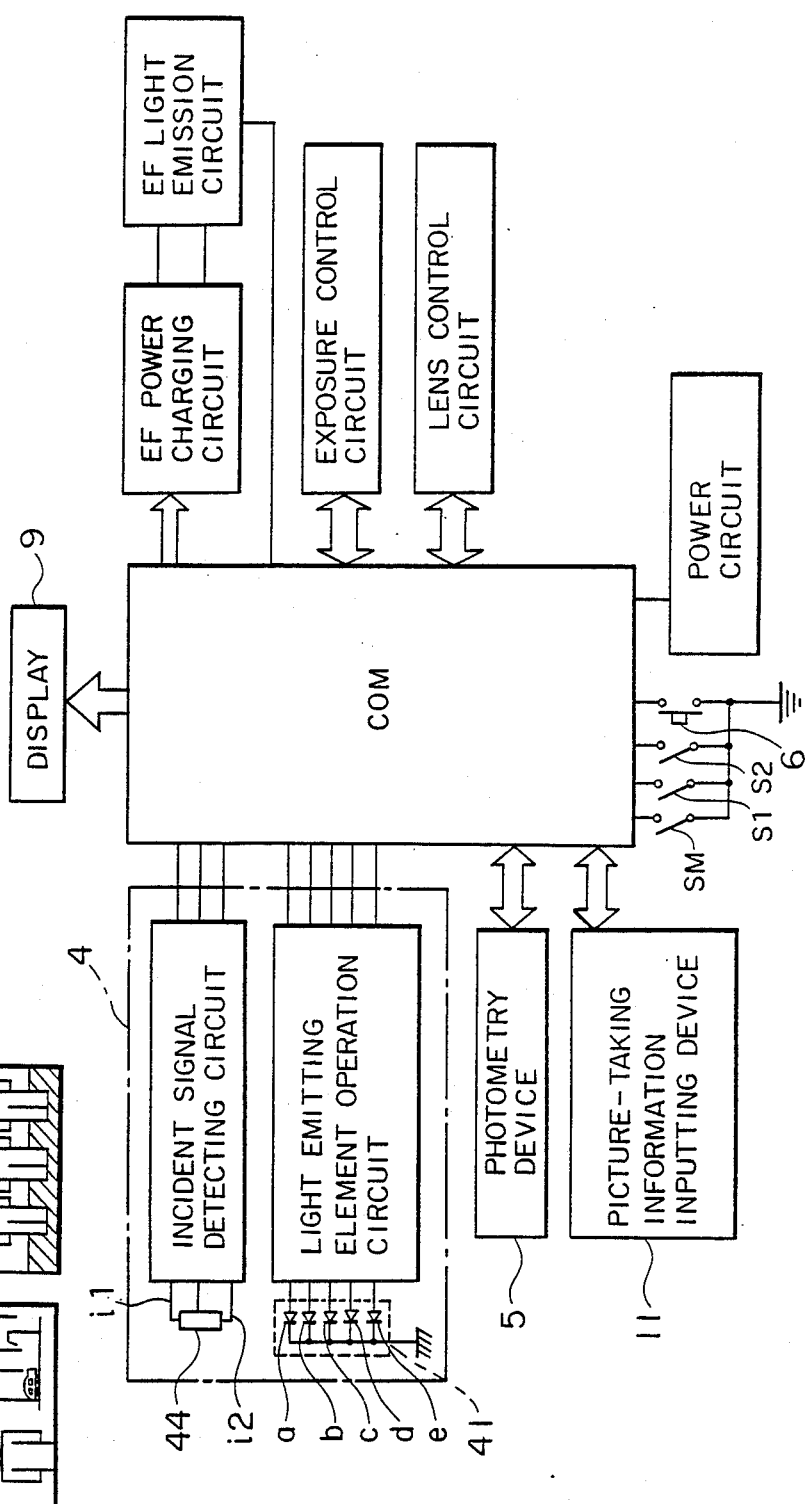
FIG. 7   FIG. 8
FIG. 9

METHOD FOR SLOW SYNCHRO-FLASH PHOTOGRAPHY

BACKGROUND OF THE INVENTION

The present invention relates to a camera for slow synchro-flash photography.

Automatic cameras have been prevalent recently. Most cameras are equipped with an automatic focus means. Generally speaking, the middle part of the picture area is in focus in the case of an automatic focus camera. When a photographer tries to focus the camera on an object which is not in the center of the picture area, he must conduct the prefocus operation of setting the image of an object in the center of the picture area and measuring the distance from the camera to the main object before taking a photograph. Namely, in the case of a two-step type release button, when the button is pressed once, the distance from the camera to the object is detected and memorized in the camera. This operation is called "focus lock". After that, if a photograph is taken with the camera, changing the direction of it, the photograph can be taken in the state of focus lock with a correct camera-to-subject distance. This method of photography is called "pre-focus photography".

The case of conducting pre-focus photography using strobe light, is considered here. When a photograph is taken using a strobe light, the method usually used is that in which the diaphragm of a camera is automatically set according to the guide number of strobe light and the camera-to-subject distance. This method is defined as "flashmatic" in this specification. Accordingly, the part of the photograph which is in focus, is correctly exposed, but all the rest is not necessarily exposed correctly. In most cases, it is under-exposed. For instance, FIG. 13 shows a photograph of a person B with a night view A of low-brightness in the background. F in the drawing is the focus frame of the AF camera to adjust the focus automatically. In the case focus is adjusted on person B as shown in FIG. 13(a), the photograph is a portrait of the person, so exposure is adjusted according to the person and under-exposure of the night view causes no problem. But, when both the night view A and the person B are wanted to be photographed as shown in FIG. 13(b), the distance from the camera to the night view A is different from that to the person B. Therefore, a photograph is taken with the pre-focus method adjusting the focus on the person B. The result is the person B who is focus-locked, can be photographed with correct exposure. But the photograph of the night view A is under-exposed and only a dark photograph is taken.

In order to solve the problem, a photographing mode called "slow synchro-flash" is conventionally known. This method will be explained as follows. According to the method, main photographic objects in the picture area can be exposed correctly by strobe light and all the rest is exposed automatically according to photometric value measured by photometry means or exposed according to the optional exposure time. In this way, both photographic objects are correctly exposed.

But when the above-mentioned slow synchro-flash photography is conducted, the mode must be set by operating a switch. Switch operation in a dark place where strobe light is used, is difficult since the switch can not be seen well. Furthermore, beginners are not familiar with slow synchro-flash photography, so sometimes they do not know about slow synchro-flash photography at all, or even if they know, they tend to forget to set the slow synchro-flash photograph mode when taking a photograph because they are too preoccupied by a photographic object or timing to press the shutter.

The object of the present invention is to solve the problems mentioned above. First of all, the invention aims at providing a camera which can completely automatically determine whether strobe light is emitted or not according to the measured distance information and photometry information, and when strobe light is emitted whether the conventional strobe light photographing conditions with flashmatic exposure are adopted or not, and slow synchro-flash photographing conditions with exposure by natural light in addition to flashmatic exposure are adopted or not. Secondly, the invention aims at providing a camera which can take a photograph of not only the main object but also all the rest, with correct exposure, when taking a photograph with the pre-focus method using strobe light.

SUMMARY OF THE INVENTION

The inventors have found that a camera which can easily achieve the first object mentioned above, can be obtained by distance measurement information according to a wide area distance measurement means and photometry information according to a photometry means, wherein the wide area distance measurement means is a method by which camera-to-subject distances of photographic objects which occupy plural regions in a picture area, can be measured.

The first example is completed according to this knowledge. The first example shows a slow synchro-flash camera which comprises: a wide area distance measurement means which can detect distances of plural photographic objects occupying a picture area; photometry which can detect luminance of photographic objects corresponding to a part or plural regions of the above-mentioned picture area; and a strobe means, wherein the camera can determine according to the information from the photometry means whether strobe light should be emitted or not, and when strobe light is emitted, the camera is equipped with a control means to choose between normal synchro-flash photographing in which exposure conditions are determined with no relation to photometry information detecting the ratio of photographic objects within and beyond strobe light photographing distance according to the information of the above-mentioned wide area distance measurement means, and slow synchro-flash photographing which has set photometry information.

In the camera of the first example, whether strobe light is emitted or not, when strobe light is emitted, whether the normal strobe light photographing conditions are adopted or the natural light photographing conditions are adopted, can be automatically decided according to the ratio of the regions of photographic objects within strobe light photographing distance to those beyond strobe light photographing distance, and according to photometry information. The following is a detailed explanation about this camera. For instance, when all or almost all of camera-to-subject distances measured by the wide area distance measurement means, are beyond the strobe light photograph distance and the information supplied by the photometry means indicates that luminance is darker than the prescribed value, it is impossible to take a photograph with this camera. When the information supplied by the photometry means indicates that luminance is brighter than the prescribed value regardless of each camera-to-subject distance, a natural light photograph corresponding to the photometry is taken by this camera. When all or almost all camera-to-subject distances are within the strobe light photographing distance and the information supplied by the photometry means indicates that luminance is darker than the prescribed value, a normal strobe-light photograph is taken by this camera. When some of camera-to-subject distances are within the strobe light photographing distance and others are beyond it, the number of subjects which are beyond the strobe light photographing distance is larger than the prescribed one, and the information supplied by the photometry means indicates that luminance is darker than the prescribed value, this camera conducts slow synchro-flash photographing, which means to take a photograph in strobe light under natural light photograph conditions.

In order to attain the second object which is to take a photograph of not only the main photographic object, but also of other objects with correct exposure, the inventors researched the characteristics of prefocus photography and found out that there are at least two different photographic objects in prefocus photography, one is the object on which the camera is focused in a fixed focus state and others are objects which would be photographic objects in a normal photograph.

The second example is based on this knowledge. In the second example, after the pre-focus operation is conducted, the distance from the camera to the would-be objects mentioned above is measured again when a photograph is taken. When the measured distance is longer than the prescribed value compared with the prefocus distance and the photometry value is smaller than the prescribed luminance, slow synchro-flash photography is conducted in this camera.

To be concrete, when the difference of the distance between the camera-to-subject distance for pre-focus photography and the distance from the camera to the would-be subjects when taking a photograph, is bigger than the prescribed value and the photometry value is smaller than the prescribed luminance, neither of the subjects will be exposed correctly. In order to solve the problem, the camera of the second example is composed to conduct slow synchro-flash photography.

BRIEF DESCRIPTION OF THE DRAWINGS

FIG. 3 is an optical path drawing to measure distance in the wide area distance measurement means in the first example.

FIG. 4 is a schematic illustration which shows an example of arrangement of plural distance measurement regions in a picture area in the first example.

FIG. 5 is a table which shows the camera-to-subject distance can be obtained at each distance measurement region in the first example.

FIG. 6 is a schematic illustration which shows an example of photometry region positions in a picture area in the first example.

FIG. 7 and FIG. 8 show examples of photographic objects in each picture area in the first example.

FIG. 9 and FIG. 10 are a block diagram of the control unit and a flow chart of control in the first example.

DETAILED DESCRIPTION OF THE INVENTION

The first example will be explained as follows using drawings.

Figure 1:
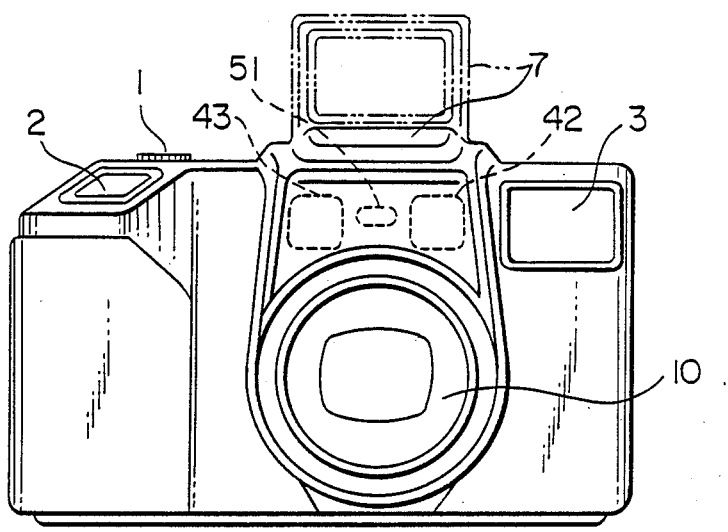
FIG. 1 and FIG. 2 are a front view and a top plan view of the camera of the present invention.
Figure 2:
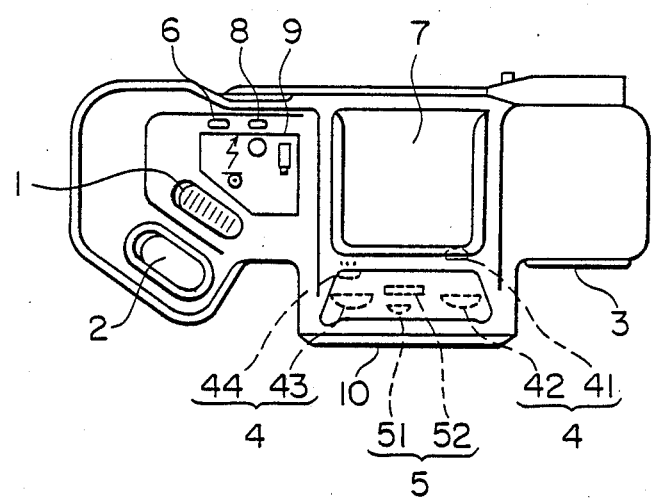
Figure 10:
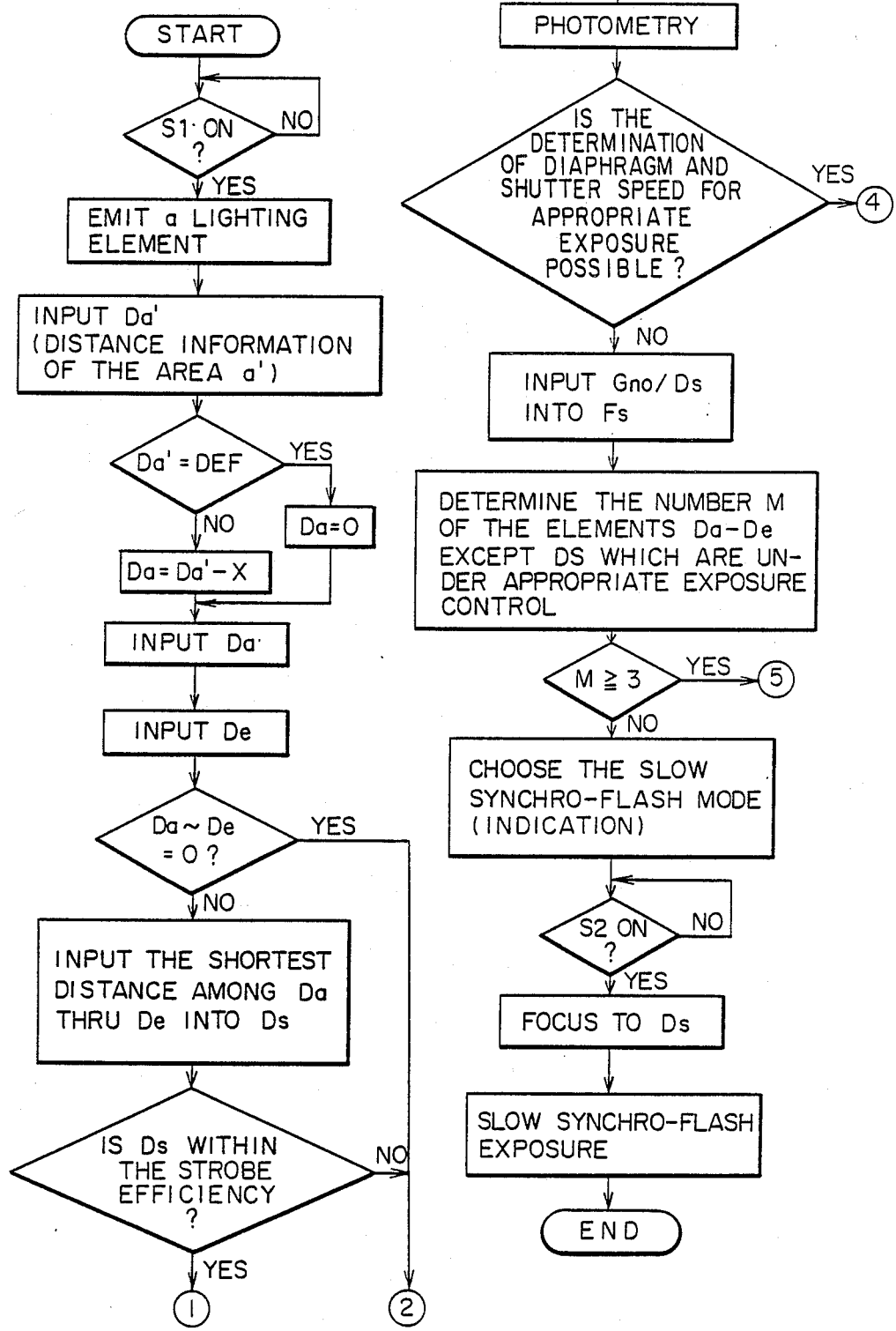
Figure 10:
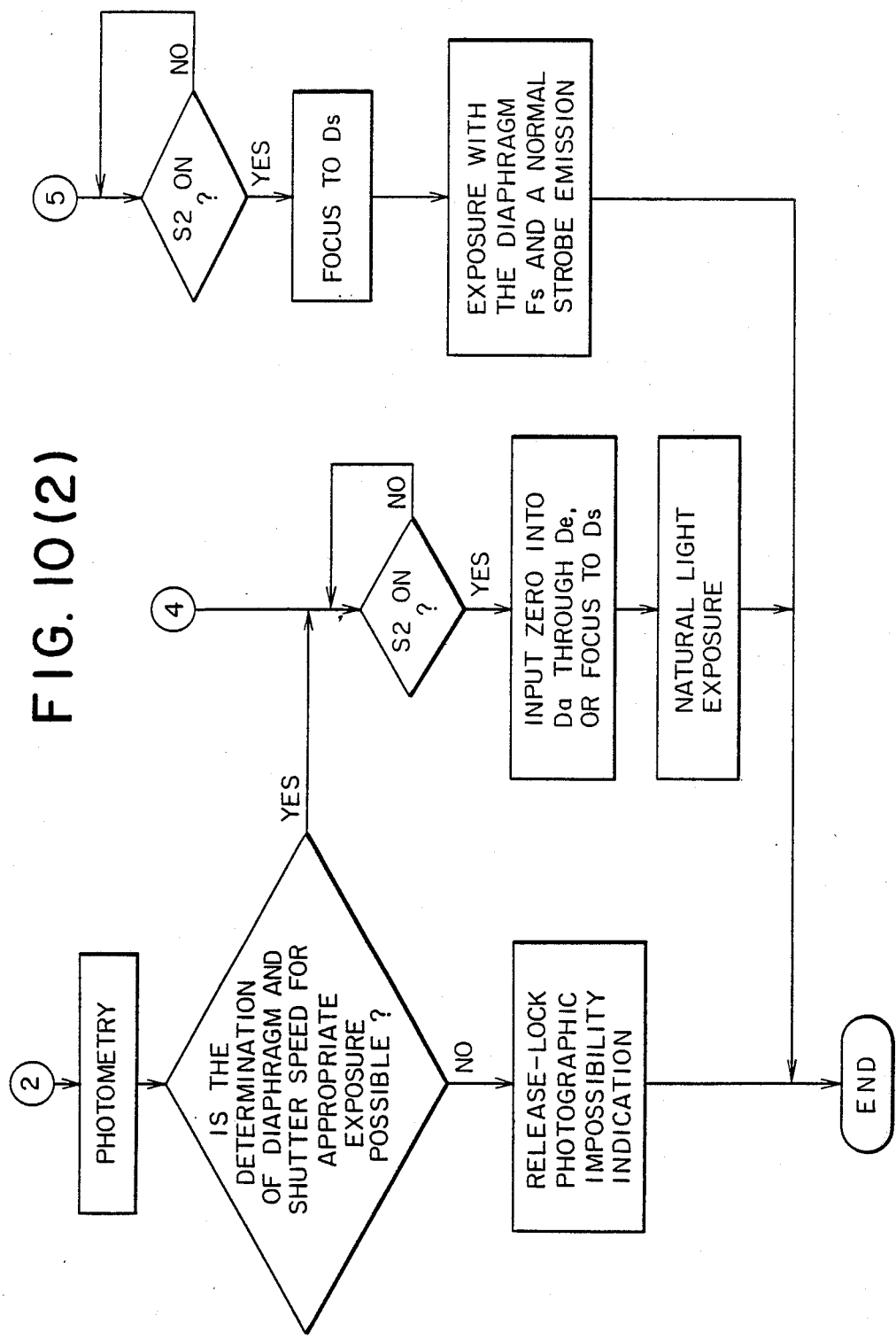

FIG. 1 and FIG. 2 are a front view and a top plan view of an example of a camera of the present invention. FIG. 3 is an optical path drawing which shows an example of the wide area distance measure means. FIG. 4 is a schematic illustration which shows an arrangement of plural distance measure regions in a picture area. FIG. 5 is a table which shows the camera-to-subject distance can be obtained at each distance measure region. FIG. 6 is a schematic illustration which shows an example of distance measure regions in a picture area. FIG. 7 and FIG. 8 are drawings which show examples of photographic objects in a picture area. FIG. 9 and FIG. 10 are a block diagram of an example of control unit and a flow chart of control.

In FIG. 1 and FIG. 2, the numeral 1 is a main switch button, the numeral 2 is a release button, the numeral 3 is a view finder window, the numeral 4 is a wide area distance measurement device, the numeral 41 is an array of light emitting elements, a through e, which is equipped with 5 infrared ray emitting elements arranged in the horizontal direction of the picture area. The numeral 42 is an incident lens. The numeral 43 is a light receiving lens. The numeral 44 is a light receiving element, like a semiconductor-type position detector (PSD). The numeral 5 is a photometry device. The numeral 51 is a light receiving lens. The numeral 52 is a light receiving element. The numeral 6 is a selecting switch button which can select a mode from among three modes, wherein the three modes are the strobe light photographing mode, the natural light photographing mode, and the automatic selecting mode which can automatically select whether strobe light emitting is conducted or not according to luminance of the photographic object. The numeral 7 is a strobe light emitting unit which can assume two positions, one is a position on the camera body, and the other is a working position standing out from the camera. The numeral 8 is a self-timer button which sets a self-timer. The numeral 9 is a display unit which shows the number of the film frame, battery consumption, the state of self-timer, ON of the strobe light photographing mode, OFF of the natural light photographing mode, and AUTO of the automatic selection mode. The numeral 10 is a picture-taking lens which is driven by an automatic focusing device including a lens control circuit shown in FIG. 9 so as to be in focus. A shutter is installed between the picture-taking lens 10 and the film surface.

When the main switch button 1 is slid from the position shown in FIG. 2 in this camera, the main switch SM shown in FIG. 9 is turned on and the strobe light unit 7 is raised from the position shown in FIG. 2 to the working position drawn by alternate long and two short dash lines in FIG. 1. Then, the camera is ready to take a photograph. When the strobe light unit 7 is returned to the position shown in FIG. 2, the main switch button 1 also returns to the position shown in FIG. 2 and the main switch SM is turned off. Namely, when the main switch SM is turned on, the microcomputer (COM) in the control unit becomes ready to control the camera to take a photograph, and displays data in the display unit 9. In this state, the camera is in the natural light photographing mode. So, OFF is displayed in the mode display section of the display unit 9. Accordingly, in order to set the camera to the strobe light photographing mode ON or to the automatic selecting mode 'AUTO', the mode selecting switch button 6 must be pressed once or twice. When it is pressed three times, the camera returns to the natural light photographing mode. In this example, the slow synchro-flash photographing mode is selected in the automatic selecting mode. When the camera is set to the strobe light photographing mode or to the automatic selecting mode, the microcomputer (COM) orders the strobe charging circuit to charge the condenser for the strobe light with electricity. The reason why the strobe circuit is made like this, is to reduce consumption of electricity by charging the strobe circuit. Charging the condenser for the strobe light is conducted by a conventional method. A photograph is taken by pressing the release button at two steps. The distance measurement and photometry switch S1 in FIG. 9 is turned on by pressing the release button at the first step. By this operation, COM controls the wide area distance measurement means 4 and the photometry means 5 to obtain distance measurement information and photometry information. Continuously, the release switch S2 is turned on by pressing the release button 2 at the second step. Therefore, COM controls the lens controlling circuit according to the distance measurement information in order to focus. Furthermore, according to the distance measurement information, the photometry information, the photographic sensitivity and latitude information of a film which was set beforehand by the photographic information input unit 11, and the information regarding whether to select the natural light photographing mode, the strobe light photographing mode, or the automatic selecting mode, factors such as the diaphragm value, the shutter time, and whether strobe light is needed or not are determined. According to the determination, the exposure control circuit is controlled to operate the diaphragm and the shutter. When strobe light is needed to take a photograph, the strobe light circuit is operated while the shutter is in operation. The photograph taking operation is conducted in this camera as mentioned above.

In the wide area distance measurement means 4, COM operates the light emitting element operation circuit and makes the light emitting elements a through e of the light emitting array emit light in order. The emitted light is reflected by the photographic object as shown in FIG. 3 onto the light receiving element 44, comprising light receiving regions A through H. According to the photocurrent i1, i2 which is output by the light receiving element 44, the incident position detecting circuit outputs the distance information to COM as shown in FIG. 5. When light flux of the light emitting element a of the light emitting element array 41 reflects on a photographic object, the distance of which is D1, and the light flux is incident on the light receiving element 44, the light receiving region A among the light receiving regions A through H, receives light most strongly. So, the incident position detecting circuit detects a position according to the photocurrent i1, i2 of the light receiving region A, and outputs the information about the distance of D1 to COM. When the camera-to-subject distance is D2 through D4, or when light flux is from light emitting elements b through e of the light emitting element array 41, the light receiving region where the light receiving element 44 receives light most intensely, is shown in FIG. 5. In this way, the incident position detecting circuit detects light receiving regions and sends the distance information to COM. The distance information supplied by the wide area distance measure means 4, is the camera-to-subject distance of the regions shown in FIG. 4 as a' through e'. The drawings show the wide area distance measure means 4 in which only one light receiving element 44 is installed. In the case a dual sensor type, in other words a three element type distance measurement system, is adopted, problems, the details of which will be explained later, in the case of the single light receiving element 44 can be solved. The dual sensor type will be explained as follows. In the dual sensor type, two light receiving elements 44 are installed symmetrically with respect to the light emitting element array 41 and the projection lens 42 and the distance information is output according to the output current i1, i2 of the two light receiving elements. For instance, refer to Japanese Patent Publication Open to Public Inspection No. 119006/1980. The problem when the number of the light receiving elements 44 is only one, is explained as follows. Projected light flux to measure distance, is incident on only half of a photographic object. Therefore, the received light image on the side of the light receiving element 44, is missing. Accordingly, the luminance center is biased and the distance measurement information to be obtained is not precise.

The photometry means 5 is installed to conduct photometry of almost all of region f in the photographic picture area which is shown by the light receiving element 52 in FIG. 6 or of the regions a" through e" corresponding to the distance measurement regions a' through e' of the wide area distance measurement means 4. The photometry means supplies the photographic object luminance information of the region f or a" through e" to COM according to the output of the light receiving element 52.

Control by COM is explained referring to FIG. 10 in the case where the selecting switch button 6 is pressed to select the automatic selecting mode in which strobe light is either emitted or not, is automatically determined and a photograph is taken.

Referring now to FIG. 10, COM causes the light emitting element a to emit light after the switch S1 is turned on by pressing the release button 2 at the first step, inputs the distance information Da' about the region a' in FIG. 4, and memorizes the distance Da which is given by that. There are two cases. One is the case of DEF where a signal by reflecting light from the photographic object is not obtained for the reason the photographic object is infinitely far or it is a black body. The other is the case where a signal is obtained. In case of DEF, the formula, Da=0, is memorized. When a signal is obtained, the formula, $Da = Da' - X$, is memorized, wherein Da' is corrected by X which relates to the position of the light emitting element a in the light emitting array 41. Computation to obtain Da from Da' can be performed either in the incident position detecting circuit or in COM. After Da has been memorized, the light emitting elements b through e are emitted in order and the distances Db through De are memorized in the same way. If at least one is not zero among Da through De, the nearest distance of them is defined as Ds and it is judged whether Ds is within the strobe light photograph distance or not. If the result is YES, it is judged whether the correct exposure diaphragm value and the correct shutter time can be obtained or not according to the above-mentioned photometry results, film photographic sensitivity, and so forth. If the judgement is NO, in other words strobe light is needed, the diaphragm value Fs=Gno/Ds corresponding to Ds is found from the distance of Ds and strobe guide number Gno and the number M is found out of Da through De except Ds, wherein M is in the correct exposure range with the diaphragm value Fs in strobe light. The number M is found by whether M is in the correct exposure range or not, wherein the correct exposure range which varies according to the kind of film, a reversal one or a negative one, is determined by detecting latitude information of Dx code of the film. When M is smaller than 3, the slow synchro-flash mode is selected and it is displayed in a view finder. As shown in FIG. 7, the slow synchro-flash mode is selected in the case the photographic objects in the picture area include an object represented by a person within a short distance and an object represented by a building at a long distance, the photographic object region in a short distance is smaller than the prescribed region, and luminance of photographic objects is relatively low. Then, the release button 2 is pressed at the second step and the switch S2 is turned on, and the picture-taking lens is adjusted to the distance Ds. According to the diaphragm value of Fs and the longest shutter time set beforehand within the period which will not cause a picture-defect by camera-shake, photographic objects which can not be exposed to strobe light, are exposed to natural light. In addition to this, the photographic objects at a short distance are exposed to strobe light or, if an operator gives priority to the shutter time, slow synchro-flash photographing is conducted with the diaphragm value Fs and the prescribed shutter time under the condition of emitting strobe light. In this slow synchro-flash photography, the exposure by strobe flash can be either before or after the natural light exposure in the whole exposure time. Namely, first of all, the photographic objects at a short distance can be exposed to strobe light and after that the photographic objects at a long distance can be exposed to natural light or the strobe light exposure can be after the natural light exposure.

In the case in which all of Da through De are zero and Ds is out of the capable distance of strobe light photography, COM judges whether the diaphragm value and shutter time for the correct exposure can be found or not according to the photometry results and photographic sensitivity of the film as shown in FIG. 10(2). When the result indicates NO, the release is locked and the display of N/A (Not applicable to take a photo) is shown in the view finder. On the other hand, when the diaphragm value and shutter time for the correct exposure are found, natural light photographing is conducted by pressing the release button 2 at the second step to turn on the switch S2 under the conditions of the diaphragm value and shutter time for the correct exposure, wherein the picture-taking lens is adjusted to an infinitely far position or to the distance Ds.

In the case in which COM judges Ds is within the strobe light photographing distance, strobe light is needed, and M is more than 3, normal photographing is conducted under the conditions of the diaphragm value Fs and strobe light emission wherein the picture-taking lens is adjusted to the distance Ds, by pressing the release button 2 at the second step and turning on the switch S2. This strobe light photography is mainly for taking a photograph of objects at a short distance represented by a person as shown in the picture area in FIG. 8, and for taking a photograph when luminance of photographic objects is low.

In the example shown in FIG. 10, the camera-to-subject distance is measured by pressing the release button 2 at the first step and the information is memorized. When the result of S2-ON check is NO, the process after a light emitting should be repeated. Then, a photograph of an object can be taken in focus just before photographing. In the example shown in FIG. 10, the photometry means 5 may conduct photometry of the region f in FIG. 6. But, in the case in which the photometry means 5 which can conduct photometry of the region a″ through e″, is used, it is possible to increase accuracy to judge whether the diaphragm value and shutter time for correct exposure can be found or not, using the results of photometry of the region corresponding to Ds by which the photometric region is narrowed down to the specific area. Furthermore, it is possible to expose photographic objects correctly which are out of strobe light photographing distance by reducing the slow synchro-flash photographing shutter time within the longest shutter time of natural light photographing. In case of the natural light photographing mode, except the automatic selecting mode, the control proceeds to (2) of FIG. 10 whether Da through Db are in the strobe light photographing range or not. In case of the strobe light photographing mode, the control proceeds to (5) of FIG. 10 whether Da through De are in the strobe light photograph range or not, whether the diaphragm value and shutter time for correct exposure can be found from the photometry results or not, and with no relation to the number of M.

In the camera of the present invention, the photographing mode can be selected from among the natural light photographing mode, the strobe light photographing mode, and the automatic selecting mode. But the camera can always be set to the automatic selecting mode, too. The camera of the invention can be a lens-shutter camera, a single-lens reflex camera, and an electronic still camera. In the example shown in the drawings, the active 5 point wide area distance measurement means is adopted, but the present invention is not restricted to this one. Namely, if a wide area distance measurement means with more distance measure points is used, higher accuracy is obtained in an automatic selecting exposure control. The invention can be applied to a wide area distance measurement means, the distance measurement points of which are arranged vertically or in the shape of a cross, and to a passive type wide area distance measurement means too. In the distance measurement means in which distance measurement points are arranged in the shape of a cross, the posture of the camera is detected, and either the vertical distance measurement elements or the horizontal distance measurement elements can be selected. Furthermore, when a photograph of the objects shown in FIG. 7 is taken, first of all, the slow synchro-flash mode is selected and the picture-taking lens is focused to the objects at a short distance by the release switch S2 ON, and flashmatic photographing is conducted. Secondly, the diaphragm is opened and the picture-taking lens is focused to the objects at a long distance and natural light photographing is conducted. As explained above, photographing control in which correct exposure and focus are obtained with respect to photographic objects both at a short distance and at a long distance, can be carried out according to the invention.

Referring now in detail to the drawings, the second example of the present invention will be explained as follows.

This example has the same constitution as the first example shown in FIG. 1 and FIG. 2 and adopts a photometry system mainly applying to the center area of the picture-taking view.

Figure 11:
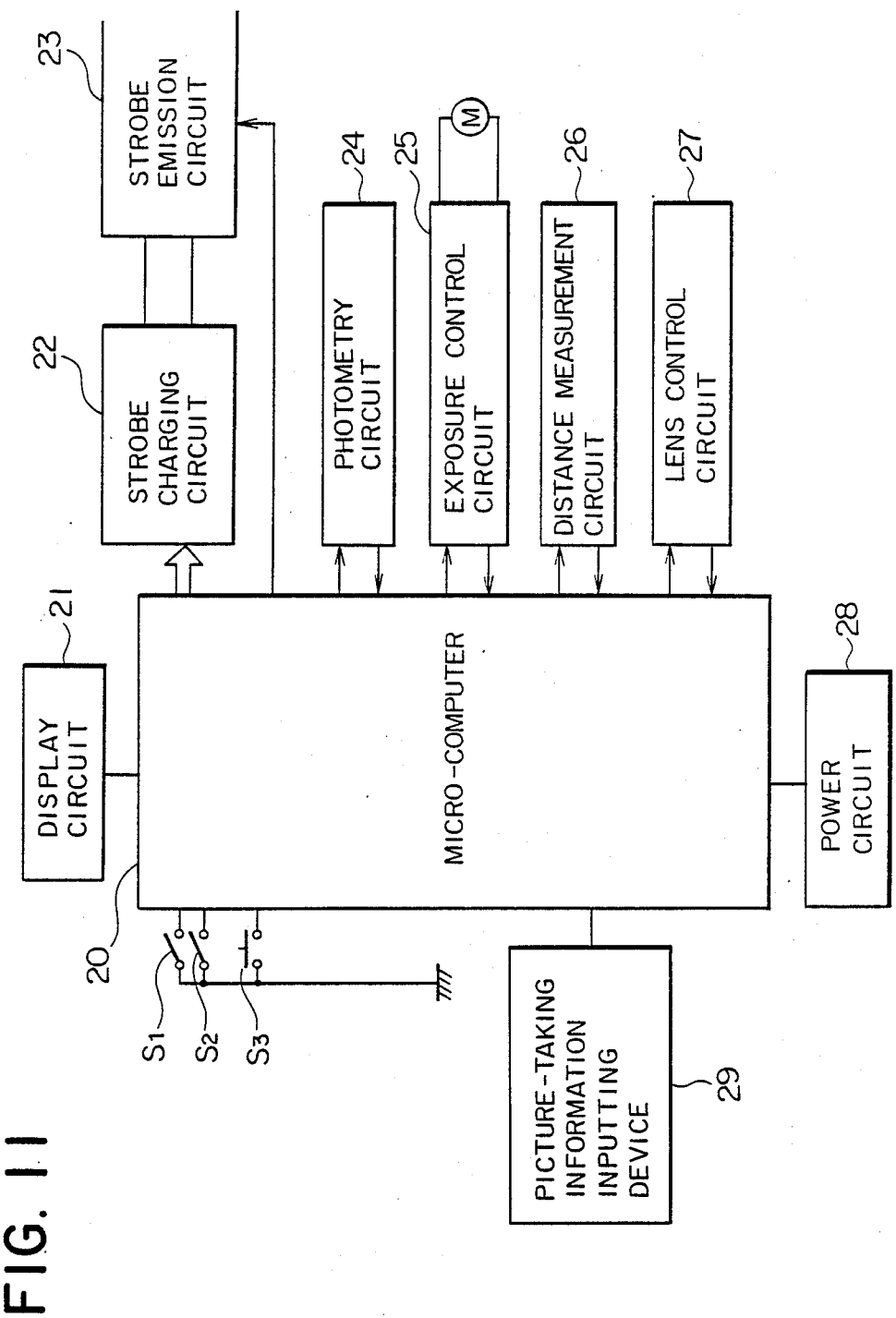
FIG. 11 is a block diagram which shows the control system of the camera in the second example.

FIG. 11 is a block diagram of the camera control system. The numeral 20 is a microcomputer which controls the photographing sequence. The numeral 21 is a display circuit which displays the number of pictures and so forth. The numeral 22 is a strobe unit charging circuit. The numeral 23 is a strobe light emitting circuit which emits strobe light by electric charge that was charged by the strobe unit charging circuit 22. The numeral 24 is a photometry circuit which processes the signal from the light receiving element 52 of the photometry unit 5 and outputs it to the microcomputer 20. The numeral 25 is an exposure control circuit which drives the shutter and controls exposure. The numeral 26 is a distance measurement circuit which receives the output from the light receiving unit 4 and outputs to the microcomputer 20 corresponding to the camera-to-subject distance. The numeral 27 is a lens control circuit which moves the picture-taking lens according to the camera-to-subject distance. The numeral 28 is an electric power circuit which supplies electric power to the microcomputer 20 and each circuit. The numeral 29 is a photographing information input unit which inputs the film photographic sensitivity information, the film latitude information, and so forth after detecting the code pattern (DX Code) installed on the side of a patrone. S1, S2 are switches which are turned on and off according to the different strokes of the release button 2. When the release button 2 is pressed one step, S1 is turned on and when it is pressed one more step, both S1 and S2 are turned on. S3 is a mode switch of the strobe unit. The mode switch S3 selects AUTO Mode first according to the state of the camera which is ready to photograph: for instance, the state of lens barriers is open or the state of the main switch is ON. Auto Mode judges luminance of a photographic object. When the measured luminance is smaller than the prescribed one, strobe light is automatically emitted in this mode. In the next step, when S3 is turned on, the mode is changed to the strobe ON Mode in which strobe light is emitted even when it is bright. Furthermore, when S3 is turned on, the mode is changed to OFF Mode in which strobe light is not emitted even in a dark place, and when S3 is turned on again, the mode becomes AUTO Mode again. The photographer can set the mode optionally by pressing S3 switch repeatedly. These modes can be recognized by the display circuit 21. The slow synchro-flash photographing in this example is carried out in AUTO Mode.

Figure 12:
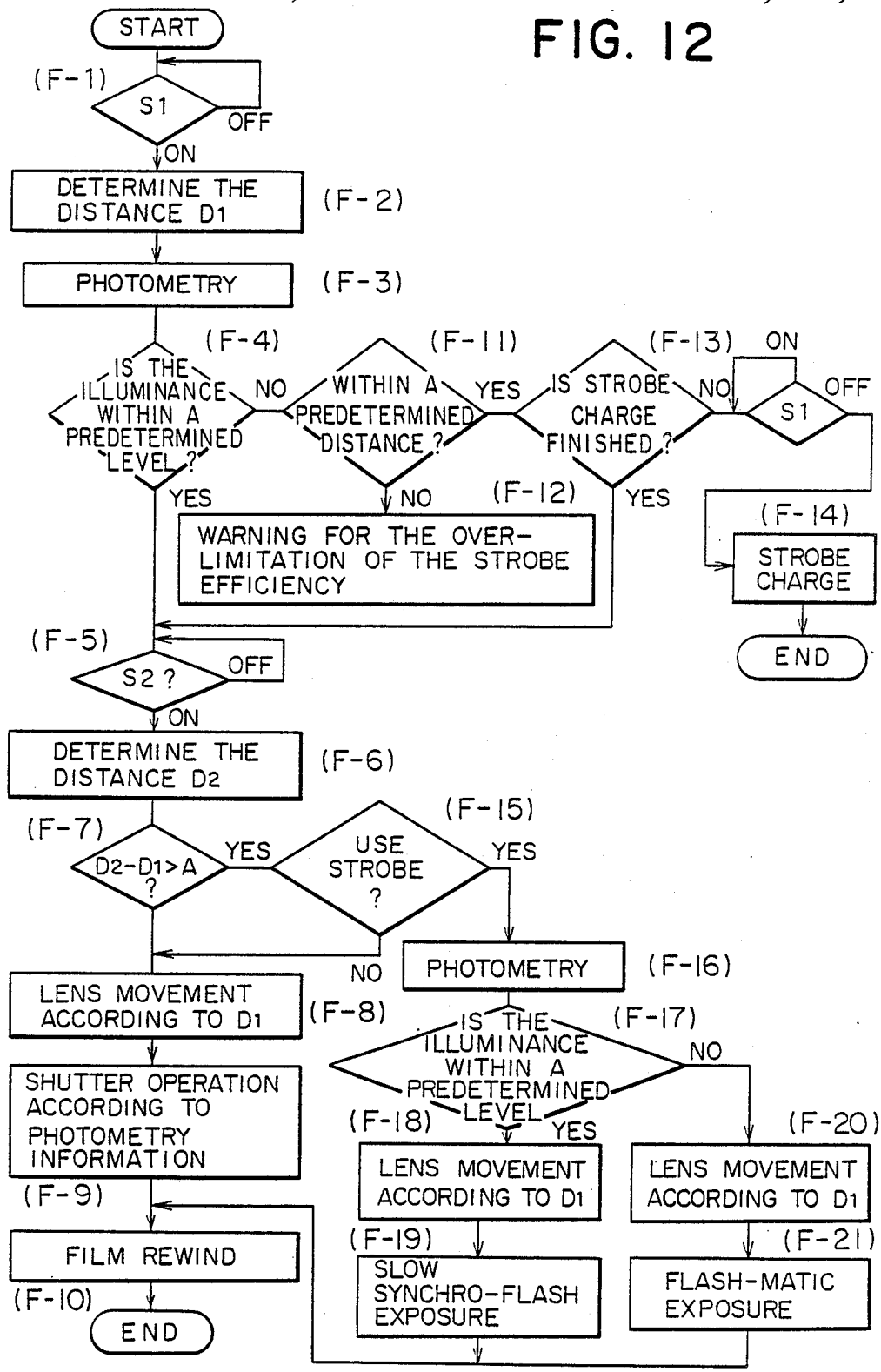
FIG. 12 is a flow chart which shows the operation of the second example.
Figure 13A:
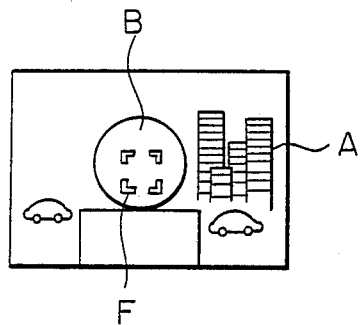
FIG. 13 is a schematic illustration which explains problems of the conventional pre-focus camera.
Figure 13B:
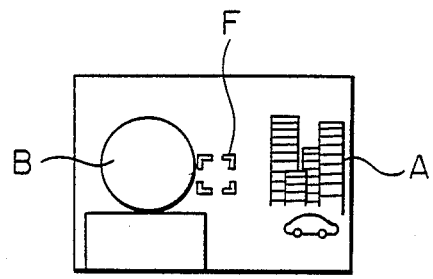

Referring now to the flow chart in FIG. 12, the operation of the second example will be explained as follows.

First of all, when the release button 2 is pressed to make S1 turn on (F—1), the distance from the camera to the object is measured (F—2). According to the signal sent from the distance measurement circuit 26, the microcomputer 26 computes the camera-to-subject distance $D_1$ with a publicly known algorithm and memorizes the results of the computation. At the next step, the photometry operation is conducted (F—3). The results of photometry is memorized in the microcomputer in the same way. The status matter if the object luminance is of the prescribed level to need strobe light is judged according to the photometry results (F—4), and when it exceeds the prescribed level, the second distance measure operation is carried out (F—6) after S2 is turned on (F—5).

At the step (F—4), when the object luminance is under the prescribed level, the camera-to-subject distance $D_1$ is checked to judge whether it is within the distance where correct exposure is obtained or not (F—11). When it is not within the prescribed distance, a warning that strobe light will not reach the photographic object, is displayed in the viewfinder and the like (F—12). When the photographic object is in the prescribed range, it is checked as to whether the strobe unit has been charged or not (F—13). When charging has not been finished, charging is started by opening S1 (F—14). When charging has been finished, the operation proceeds to the next step (F—14).

In this camera, when the zooming strobe light emitting unit 7 is raised by operating the main switch 1 or film feed is finished in this state, strobe unit charge is started after the zooming lens has been driven. At the step (F—13), it is checked whether strobe unit charge is finished or not. When it is not finished, strobe unit charge is continued further.

When the measured distance $D_2$ is detected by the second distance measurement (F—6), a comparison between $D_1$, which is the distance measured when focus is locked, and $D_2$, is made, and it is judged whether $D_2$ is bigger than $D_1$ by the prescribed value or more (F—7). When $D_2$ and $D_1$ are different from each other, it is judged that pre-focus photographing is being conducted. When $D_2$ is bigger than $D_1$, it is judged that the focus point has moved from the main photographic object to the background. In other words, at the step (F—7), it is judged whether prefocus photographing is being conducted or not.

The prescribed value A is computed by the microcomputer 20 according to the guide number of the strobe unit, the camera-to-subject distance $D_1$, and latitude of the film. For instance, if it is provided that the guide number is 12 and $D_1$ is 3m, the diaphragm value is F4. In this case, assuming that the latitude of a negative color film is ±1EV, correct exposure is obtained by strobe light emission when $D_2$ is 2.1m to 4.2m. In other words, when $D_2$ is more than 4.2m, strobe light photographing alone can not obtain correct exposure, so slow synchro-flash photographing is carried out in this case. In this example, the prescribed value A is 1.2m (4.2m—3.2m). The film latitude is input to the microcomputer 20 as the film DX information by the photograph relating information input unit 29. A negative film is specially distinguished from a reversal film by this and the prescribed value A varies.

When $D_2-D_1$ is smaller than the prescribed value A, in other words, $D_2$ is in the strobe light exposure range, the picture-taking lens is driven according to $D_1$ (F—8), the shutter is driven by the photometry information of the step (F—9), the film is wound by the film feed motor by the length of a frame (F—10), and photographing is finished. But, in the case in which $D_2$ is smaller than $D_1$, the picture-taking lens can be driven according to $D_2$. The stroke time from $S_1$ to $S_2$ is measured by the microcomputer. At the same time, according to the difference between the distance measurement results when S1 is ON and when S2 is ON, in other words, the amount of movement of the photographic object, the amount of the movement of the photographic object, which moves during the time lag from S2 ON to photographing, can be predicted. The picture-taking lens can be focused according to the prediction of the photographic object.

When $D_2-D_1$ is bigger than the prescribed value A, in other words, $D_2$ is out of the correct exposure range of strobe light, it is checked based on the photometry information of the step (F-3) as to whether strobe light is necessary or not (F-15). If it is not necessary, the process proceeds to the step (F-8), and if necessary, the second photometry operation is conducted (F-16). The object of this operation is to conduct slow synchro-flash photographing in accordance with luminance of the object after the camera angle has been changed.

At the next step, the second photometry operation is carried out (F-16), and it is checked whether luminance of the photographic object is in the prescribed range or not (F-17). When the luminance is more than the prescribed level, the picture-taking lens is driven according to the distance measurement value $D_1$ which was measured in the state of focus-lock (F-18). Slow synchro-flash phtographing is carried out, in which the main photographic object is exposed to strobe light to obtain correct exposure and AE photographing is conducted according to the photometry data obtained at the step (F-16) against the background except the main object (F-19). When AE photographing is conducted, the shutter speed can be selected to be a little faster than the one computed according to the luminance of the background, for instance a night view, to create the atmosphere of the night. By this method, a photograph of both the main photographic object and its background can be taken with correct exposure in the prefocus photographing using the strobe light emitting unit.

In the case in which the second photometry value is lower than the prescribed level of luminance, if slow synchro-flash photographing is carried out, the exposure time is so long that a picture defect by camera-shake may be caused. So, after the picture-taking lens is driven according to the distance $D_1$ which was measured in the state of focus-lock, the normal flashmatic photographing is conducted (F-21).

In the first and second example explained above, when the main photographic object is not in the center portion of the picture area, the photographer is naturally aware of the background apart from the main object in photographing. Therefore, after flashmatic photographing is carried out in which a photograph is taken focused on the main object, the diaphragm of the camera can be stopped down to get the depth of focus so that a fine picture of the background can be obtained.

The method to attain the object will be explained as follows.

For instance, the shutter blades which are also used as the diaphragm, are driven by a motor. When the shutter is opened, flashmatic photographing is conducted in strobe light in accordance with the prescribed shutter timing. The main photographic object is correctly exposed and the shutter blade opening can be controlled so that the background can be in focus.

Moreover, the position of the main photographic object in the picture area after it has moved, can be computed and the direction of strobe light can be changed to it. Furthermore, the main object's range can be computed and only the main object can be exposed to strobe light by adjusting the illumination angle of strobe light according to the computation.

As explained before, in the first example of the present invention, the ratio of the region within the distance of strobe light photographing range to that out of strobe light photographing range, is detected at each camera-to-subject distance with regard to plural distance measurement points given by the wide area distance measurement means. According to the information mentioned above, the photometry information, and other information related to photographing, it is automatically determined whether strobe light emission is needed or not. In a case in which it is needed, it is automatically determined whether to choose normal strobe light photographing or slow synchro-flash photographing. For the reasons stated above, the first example of the invention enables even a beginner to easily conduct slow synchro-flash photographing in which both a main photographic object and a background can be correctly exposed.

According to the second example of the present invention, when a photograph is taken, the camera-to-subject distance is measured again. In the case in which the measured distance is longer than the one at prefocusing by the prescribed value or more, and the photometry value is less than the prescribed luminance or equal to it, slow synchro-flash photographing is automatically conducted. Therefore, when prefocus photographing is conducted without using strobe light, even a photograph of an object except a pre-focused main one can be taken with correct exposure. Accordingly, an operator does not need any preliminary knowledge or preparation. Since all he has to do is the conventional pre-focusing operation, even a beginner can easily take a photograph with correct exposure. Namely, either in the first example or in the second example, a photograph can be taken by a slow synchro-flash photographing method through the simple operation.

What is claimed is:

1. A method for taking a photograph with a camera, the camera having a flash light exposure mode with a predetermined light efficiency, a natural light exposure mode, and an automatic selection mode where the camera can automatically select the flash light or natural exposure mode depending upon photographic conditions, the method comprising the steps of:
   determining a plurality of distances between the camera and a plurality of objects occupying a picture area, by wide area distance measurement means;
   classifying the objects in the picture area into a plurality of background objects which are at a distance beyond the flash light efficiency of the flash light exposure mode, and at least one foreground object being within the range of the flash light efficiency of the flash light exposure mode;
   detecting a plurality of luminances of the background and foreground objects with the use of a photometry device; and
   activating the camera to photograph the at least one foreground object in the flash light exposure mode and the background objects in the natural light exposure mode to correctly expose all of the objects in the picture area.

2. The method of claim 1 wherein the wide area distance measurement means comprises an array of light emitting elements reflected by the objects onto a plurality of light receiving regions of at least one light receiving element, wherein distance information corresponding to the light receiving regions of the light receiving element that receives the reflected light emitted from the array of light emitting elements most strongly is memorized by a memory means.

3. The method of claim 1 wherein the step of activating the camera further includes focusing on the at least one foreground object when the flash light exposure mode is used and focusing on the background objects when the natural light exposure mode is used.

4. The method of claim 1 wherein the step of activating the camera further includes determining a diaphragm of a lens of the camera by an exposure control means for the flash light exposure mode, and maximizing the diaphragm of the lens of the camera for the natural light exposure mode.

5. A method for taking a photograph with a camera, the camera having a flash light exposure mode, a natural light exposure mode, and an automatic selection mode where the camera can automatically select the flash light or natural exposure mode depending upon photographic conditions, the method comprising the steps of:

focusing on a first object in a picture area by an automatic focusing means, the automatic focusing means having a predetermined focusing area;

determining a first distance from the camera to the first object;

detecting a luminance of the first object;

memorizing the first distance in a memory means;

determining a second distance from the camera to a second object within the picture area, the second object being located in the predetermined focusing area of the automatic focusing means when taking the photograph;

detecting a luminance of the second object; and activating the camera for taking a photograph using the flash light exposure mode for one of the first or second objects and the natural light exposure mode of the other first or second object according to the distances and luminance conditions of the first and second objects.

6. The method of claim 5 wherein the step of activating the camera includes taking the photograph using the flash light exposure mode for the first object and the natural light exposure mode of the second object when a length between the first distance and the second distance is greater than a predetermined length and the luminance of the second object is less than a predetermined luminance.

7. The method of claim 6 wherein the step of activating the camera further includes focusing on the first object when the flash light exposure mode is used and focusing on the second object when the natural light exposure mode is used.

8. The method of claim 6 wherein the step of activating the camera further includes determining a diaphragm of a lens of the camera by an exposure control means for the flash light exposure mode, and maximizing the diaphragm of the lens of the camera for the natural light exposure mode.

* * * * *